M. WEINRICH.
PROCESS OF MANUFACTURING REFINED SUGAR.
APPLICATION FILED FEB. 1, 1913.
1,084,771.
Patented Jan. 20, 1914.
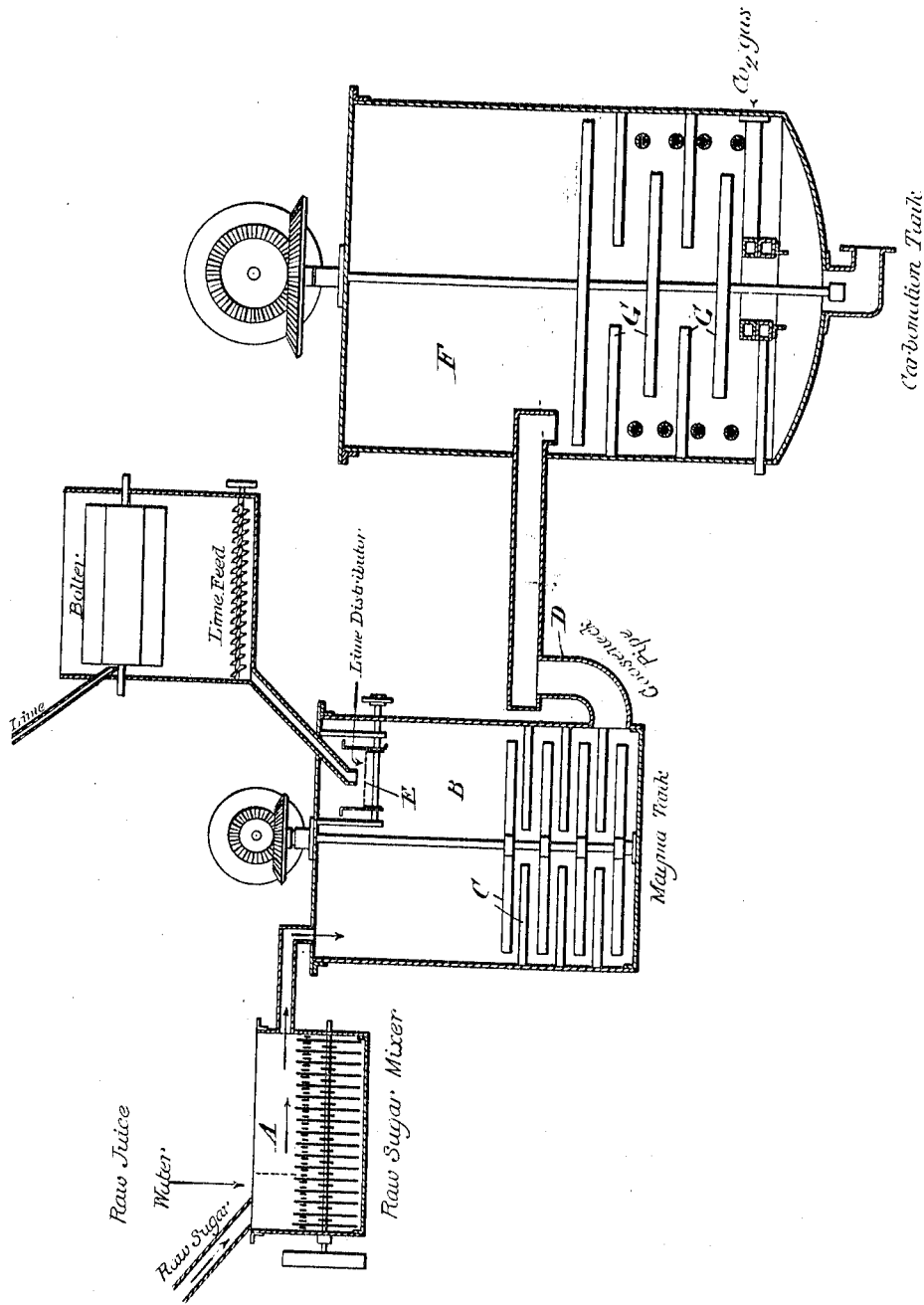
WITNESSES
INVENTOR
Moriz Weinrich
By T. Walter Fowler
Attorney

UNITED STATES PATENT OFFICE.

MORIZ WEINRICH, OF YONKERS, NEW YORK.

PROCESS OF MANUFACTURING REFINED SUGAR.

1,084,771. Specification of Letters Patent. Patented Jan. 20, 1914.

Application filed February 1, 1913. Serial No. 745,623.

*To all whom it may concern:*

Be it known that I, MORIZ WEINRICH, a citizen of the United States, residing at Yonkers, in the county of Westchester and State of New York, have invented certain new and useful Improvements in Processes of Manufacturing Refined Sugar, of which the following is a specification.

My invention relates to a novel process of manufacturing refined sugar on cane sugar plantations, and the invention consists of the process hereinafter fully described and pointed out in the claims.

In carrying out my process I may invoke the assistance of any suitable mechanism, such for instance, as shown in the drawing, wherein the figure represents a part section and part elevation of an apparatus capable of carrying out my invention.

In my former Patents No. 711,603, dated October 21, 1902, and No. 822,171, dated May 29, 1906, I have disclosed processes of purifying raw sugar, masse-cuite, or syrup, which processes are based on the observation that lime, especially when applied in the form of finely powdered caustic lime (CaO) will act with much greater energy on color and impurities, present in sugar solutions, when such solutions are in a concentrated or syrupy state. It is thereby immaterial whether sugar crystals are present in such solutions or not. In my experiments I have found that the same observation can be applied to good advantage in manufacturing refined sugar direct from raw cane juice on cane sugar plantations, which is the essential object of the present invention. The working expenses at such places as mentioned where lime-stone can be procured at reasonable price, are not much greater than when making raw sugar by the present methods, while the yield in refined sugar, owing to the great purification and removing of viscosity by the process, is almost as great in weight as of raw sugar made by the present known methods.

In carrying out my present invention I may proceed along the following lines:—

All the II and III raw sugar obtained from the syrup from refined sugar of previous boilings and also any desired quantity of raw sugar from other sources, is mixed with raw cane juice, coming from the mills, in a suitable horizontal mixer, A, shown in the accompanying drawing, into a magma or syrup. Neither the mill juice nor the raw sugar shall be heated previously so that the temperature of the mixture will not exceed say 30° C. This magma or syrup is designed to run continuously from the horizontal mixer into a suitable vertical mixer, B, provided with agitators, C, which may be in the form of stirring or mixing arms, said vertical mixer having also a so-called goose-neck pipe, D, connected with its bottom and which pipe shall have a height of about three (3) feet to provide for a continuous outflow, which is regulated by the inflow from the horizontal mixer. To the magma or syrup in the vertical mixer is added continuously by means of a suitable screen or sieve, E, a certain amount of finely powdered caustic lime (CaO). The quantity of this lime powder shall vary according to the amount and quality of cane ground and the quantity of raw sugar mixed with the raw juice. If, for instance, 1,000 tons of cane are ground in 24 hours and 100 tons of raw sugar mixed with the raw juice, the total amount of lime powder to be used shall be from 14 to 20 tons so that every hour 1160 to 1600 lbs. or every minute from 19 to 27 lbs. of lime powder shall be added to the mixture of raw juice and raw sugar. This amount of caustic lime when added to the magma or syrup will charge it considerably, will give it a whitish color and turn it into a rather stiff mass. Owing to the small amount of water in this mass it will slake very slowly and will have ample time to act in its caustic state very energetically on the impurities and the color not alone of the magma or syrup but also subsequently, when mixed with additional quantities of raw juice in the carbonation tanks, on impurities and color of the additional raw juice.

The mixing tank, B, is designed to be large enough to allow the treated mass to remain therein from 15 to 20 minutes when it flows out in a continuous stream through the aforesaid goose-neck pipe. Through the action of the slowly slaking lime the temperature of the mass will be raised during this time to 45 to 50° C. which temperature I have found will prevent the destruction of fruit sugar.

The mass, treated as above, will run continuously through the goose-neck pipe into one of a series of carbonation tanks, F, provided with stirrers, G, and which tank has previously been filled about four feet high with raw juice, coming from the mills. This raw juice shall have a temperature of about 35° C. As soon as the mass begins to drop into the raw juice the stirrers shall be set in motion. The mass, highly charged with lime which has only partly slaked, will mix thoroughly with the raw juice and act while still partly in its caustic state, very energetically at once on the impurities and color of the raw juice without destroying any of the fruit sugar.

About 1¼ to 1½ feet of mass is permitted to run into the carbonation tank so that the tank will be filled about 5¼ to 5½ feet high and the carbonated solution will have a density of 25 to 30° Brix. As soon, or a few minutes before the desired quantity of mass has been mixed into the raw juice carbonic acid gas is pumped into the mixture from a suitable lime-kiln or other source of supply, with which the plant will be supplied. As soon as the alkalinity of the solution has been brought down by the gas to about 0.1%, the admission of gas is cut off. The temperature of the solution shall be maintained during carbonation below 45° C., which temperature I have found essential to prevent the destruction of fruit sugar. When the carbonation is completed to the above alkalinity the solution can be safely heated to about 55° C. and is then pumped through suitable filter-presses in the well known manner. The filtered juice, passing from the filter-presses, is run into another series of carbonation tanks where some more lime is added this time in the shape of milk of lime. This lime shall amount to $\frac{1}{10}$% to $\frac{1}{8}$% of CaO of the weight of cane ground. The juice is now carbonated again without previous heating, the carbonation being this time to 0.01% alkalinity or almost neutrality. The juice is then heated to 95–100° C. and filtered again through filter-presses. The filtered juice is now evaporated in what is known as a triple effect to about 55° Brix and pumped into tanks. This thickened juice is here treated with about $\frac{1}{10}$% lime in the shape of milk of lime of weight of cane, neutralized again by means of carbonic acid or a mixture of carbonic acid and sulfurous acid, heated to about 90° C. and filtered through mechanical filters of some appropriate type. It is then drawn into a vacuum pan and boiled to refined sugar. Instead of powdered caustic lime, also powdered dry slaked lime or lime slaked to a paste may be used, I generally prefer, however, the use of powdered caustic lime as its action is much more energetic than that of hydrated lime.

Having thus described my invention what I claim as new and desire to secure by Letters Patent is:—

1. The process herein described of obtaining the combined purification of raw cane juice and raw cane sugar, said process consisting in first mixing, while in a cold state, raw cane juice with raw cane sugar, to a magma or syrup, then charging this magma or syrup with finely divided lime, mixing this lime-charged mass with additional quantities of raw cane juice, neutralizing the mixture by means of carbonic acid, heating, filtering and evaporating this purified juice, and preparing it by these steps for the manufacture of refined sugar.

2. The process herein described of obtaining the combined purification of raw cane juice and raw cane sugar, said process consisting in first mixing, while in a cold state, raw cane juice with raw cane sugar to a magma or syrup, then charging this magma or syrup with finely powdered caustic lime (CaO), mixing this lime-charged mass, before the lime in it has completely slaked, with additional quantities of raw cane juice, neutralizing the mixture by means of carbonic acid, heating, filtering and evaporating this purified juice, and preparing it by these steps for the manufacture of refined sugar.

In testimony whereof I affix my signature in presence of two witnesses.

MORIZ WEINRICH.

Witnesses:
 EDWARD G. CONICK,
 GEORGE A. SMITH.